(12) United States Patent
Hayashi

(10) Patent No.: US 6,816,835 B2
(45) Date of Patent: Nov. 9, 2004

(54) ELECTRONIC MAIL SYSTEM AND DEVICE

(75) Inventor: Kiyoko Hayashi, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 408 days.

(21) Appl. No.: 09/800,480

(22) Filed: Mar. 8, 2001

(65) Prior Publication Data

US 2001/0054074 A1 Dec. 20, 2001

(30) Foreign Application Priority Data

Jun. 15, 2000 (JP) .................................... 2000-179295

(51) Int. Cl.$^7$ ............................................. G10L 13/00
(52) U.S. Cl. ...................... 704/260; 704/270; 707/101
(58) Field of Search ................................. 704/208, 275, 704/251, 258, 278, 770; 709/206, 260; 707/101

(56) References Cited

U.S. PATENT DOCUMENTS

| | | | | |
|---|---|---|---|---|
| 5,045,940 A | * | 9/1991 | Peters et al. | 348/472 |
| 5,555,343 A | * | 9/1996 | Luther | 704/260 |
| 5,640,590 A | * | 6/1997 | Luther | 715/500.1 |
| 5,799,318 A | * | 8/1998 | Cardinal et al. | 707/101 |
| 5,818,447 A | * | 10/1998 | Wolf et al. | 345/752 |
| 6,360,252 B1 | * | 3/2002 | Rudy et al. | 709/206 |
| 6,405,244 B1 | * | 6/2002 | Bando et al. | 709/206 |
| 6,510,438 B2 | * | 1/2003 | Hasegawa | 707/104.1 |
| 2002/0032702 A1 | * | 3/2002 | Horii | 707/515 |

FOREIGN PATENT DOCUMENTS

JP          10198615          7/1998

* cited by examiner

Primary Examiner—Susan McFadden
(74) Attorney, Agent, or Firm—Birch, Stewart, Kolasch & Birch, LLP

(57) ABSTRACT

Insertion of an attachment file identifying character code in a text of an electronic mail enables an electronic mail device to automatically reproduce (display) data from the attachment file during vocal reproduction of the text. When a text of a received electronic mail was selected and a vocal reproduction start key of the device was pressed, the device stores vocally readable text data to be sent to a voice synthesis control portion and attached reproducible music data in a buffer portion of a random access memory. The device then transmits a voice synthesis and reproduction command to a voice synthesis control portion to vocally reproduce the text. When the device detected an attachment file identifying character code in the text being displayed and vocally reproduced, it converts the text sentence into voice synthesis/reproduction command data and sends the command data to the control portion to vocally reproduce the text. On completion of reproduction of the textual portion of the electronic mail, the device automatically reproduces music data of the attached music file and image data of the attached image file referring to the corresponding files by detected reference codes.

7 Claims, 10 Drawing Sheets

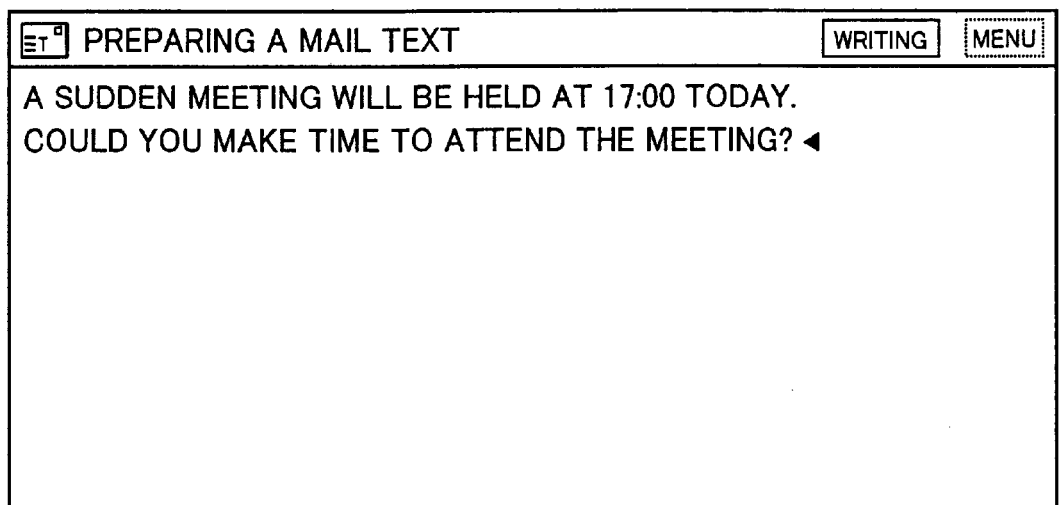

FIG.9

<MUSIC DATA>

| ID | DATA |
|---|---|
| 1 | MELODY DATA A |
| 2 | MELODY DATA B |
| 3 | MELODY DATA C |
| 4 | MELODY DATA D |
| 5 | MELODY DATA E |
| ⋮ | ⋮ |

FIG.10

<IMAGE DATA>

| ID | DATA |
|---|---|
| 1 | IMAGE DATA A |
| 2 | IMAGE DATA B |
| 3 | IMAGE DATA C |
| 4 | IMAGE DATA D |
| 5 | IMAGE DATA E |
| ⋮ | ⋮ |

FIG.11

<MAIL 1>

<MAIL DADTA>

```
MAIL TEXT
  [MELODY 0]···[MELODY 1]
  ⋮
  [IMAGE 2]···
```

<REFERENCE ID TABLE FOR ATTACHMENT FILE>

<MAIL DATA>  <MUSIC/IMAGE>  <ID>

| [MELODY 0] | MUSIC | 1 |
| --- | --- | --- |
| [MELODY 1] | MUSIC | 2 |
| [IMAGE 2] | IMAGE | 3 |

<MAIL 1>

<MAIL DADTA>

```
MAIL TEXT
  [MELODY 0]··· [IMAGE 1]
  ⋮
  [IMAGE 2]···
```

<REFERENCE ID TABLE FOR ATTACHMENT FILE>

<MAIL DATA>  <MUSIC/IMAGE>  <ID>

| [MELODY 0] | MUSIC | 3 |
| --- | --- | --- |
| [IMAGE 1] | IMAGE | 1 |
| [IMAGE 2] | IMAGE | 2 |

FIG.12

\<MAIL TEXT\>

> A SUDDEN MEETING WILL BE HELD AT 17:00 TODAY.
> [MELODY 1]
> COULD YOU MAKE TIME TO ATTEND THE MEETING ?
> [IMAGE 2]
> PLEASE GIVE ME A RING IF YOU HAVE NO TIME.
> SEE YOU LATER.
> [MELODY 3]

\<ATTACHMENT FILES\>

> ATTACHED MUSIC FILE (MELODY 1)
> ATTACHED IMAGE FILE (IMAGE 2)
> ATTACHED MUSIC FILE (MELODY 3)

\<VOICE REPRODUCTION\>

S121: A SUDDEN MEETING WILL BE HELD AT 17:00 TODAY.

S122: REPRODUCING ATTACHED MUSIC FILE (MELODY 1)

S123: COULD YOU MAKE TIME TO ATTEND THE MEETING ?

S124: REPRODUCING ATTACHED IMAGE FILE (IMAGE 2)

S125: PLEASE GIVE ME A RING IF YOU HAVE NO TIME. SEE YOU LATER.

S126: REPRODUCING ATTACHED MUSIC FILE (MELODY 3)

END

ELECTRONIC MAIL SYSTEM AND DEVICE

BACKGROUND OF THE INVENTION

The present invention relates to an electronic mail system and, more specifically, to an electronic mail device having vocally reproducing function, which is capable of reading aloud text of a received electronic mail and automatically reproducing audio data or displaying visual data in files attached to the electronic mail.

In Japanese Patent Publication No.10-198615, the present applicant has disclosed a technique of reading aloud electronic mail text, which enables electronic mail devices to display an image and characters of a text on the same screen by inserting an icon of image information and an icon of a program for controlling the image display points (beginning and ending timings) in character strings of the electronic mail text. Unfortunately, this technique has to insert control information in every mail text, which information is, however, unnecessary for usual electronic mails and devices unable to use these control codes. In addition, the insertion of unnecessary codes makes the electronic mail text be unpleasant to see and difficult to read.

SUMMARY OF THE INVENTION

Accordingly, a primary object of the present invention is to provide an electronic mail system that has insertion of only a character code referring to an attached music or image data file in electric mail text and enables people to enjoy vocally audio-visually reproducible electronic mail with easier operation and pleasant display, which is capable of vocally reproducing electronic mail text, detecting in the electronic mail text a character code referring to an attached thereto music or image data file and automatically reproducing (or display) the detected file content.

To realize the above object, the present invention, instead of an icon representing an image display program used in the prior art, inserts in a usual electronic mail text only a character code (character string) informing of a timing to refer and reproduce an attached file of music data or image data.

When the attached file reference character code is recognized in the process of reading aloud (by synthesized voice) the electronic mail text, the attached file data is automatically reproduced (or displayed). This can eliminate the use of unnecessary character codes, thereby making the text easier to read and reducing the quantity of data to be processed by the system.

In vocal reproduction of the electronic mail text being displayed on a display screen, the electronic mail device can reproduce music data and/or image data at timing designated by an electronic mail sender, enabling an electronic mail receiver to subsequently reproduce and display text, music or image data by a single operation. Namely, there is no need for the receiver to open each of attached files to be reproduced.

Since such music data and image data can be easily attached to an electronic mail in a well-known manner, such data may be easily transmitted and received and electronic mails may also be easily prepared.

Another object of the present invention is to provide an electronic mail system that enables electronic mail devices having function of vocally reproducing an electronic mail text to exchange electronic mails with an attachment file identifying character code (character string) inserted in a text of each electronic mail so that the devices may reproduce or display the data from the attached file designated by the character code in a given timing while vocally reproducing the electronic mail text.

A further object of the present invention is to provide an electronic mail device comprising a memory for storing an electronic mail data and attached file data, an input portion such as a keyboard for entering characters, a liquid crystal display portion for displaying characters (text) and images, a voice synthesizer control portion and a speaker and having a vocally reproducing function, which is capable of reproducing the text of a received electronic mail with an associated music data file in such a way that in process of reading aloud a text being displayed on a mail image screen it recognizes a reference character code (character string identifying the music file) inserted in the text and at this point reproduces the music data from the file identified by the character code.

Another object of the present invention is to provide an electronic mail device comprising a memory for storing an electronic mail data and attached file data, an input portion such as a keyboard for entering characters, a liquid crystal display portion for displaying characters and images, a voice synthesizer control portion and a speaker and having a vocally reproducing function, which is capable of reproducing a text of a received electronic mail with an associated image data file in such a way that, in process of reading aloud a text being displayed on a mail image screen, it recognizes a reference character code (character string for the image file) inserted in the text and at this point displays the image data from the file identified by the code.

A further object of the present invention is to provide an electronic mail device that, in the process of vocally reproducing an electronic mail content, can refer to an attached music file and reproduce music data therefrom and, after completing or stopping the reproduction of the file, can automatically return to reading the next phrase of the mail text and repeat the above cycle operation.

A further object of the present invention is to provide an electronic mail device that, in the process of vocally reproducing an electronic mail content, can refer to an attached image file and displays image data from there and, after completing or stopping the reproduction of the file, can automatically return to reading the next phrase of the mail text and repeat the above cycle operation.

BRIEF DESCRIPTION OF THE DRAWINGS

FIG. 4 illustrates an exemplary layout of a text on a screen image for preparing an electronic mail text.

FIG. 5 illustrates an exemplary layout image of a menu (a list of selectable items).

FIG. 9 illustrates an exemplary data structure of music data registered in a music data portion 93 of a random access memory (RAM) 9.

FIG. 10 illustrates an exemplary data structure of image data registered in an image data portion 94 of the random access memory (RAM) 9.

FIG. 11 illustrates an exemplary data structure of an electronic mail text and a reference ID table for an attachment file.

FIG. 12 illustrates a practical example of an electronic mail text, an attachment file and a procedure for reproducing voice message of an electronic mail prepared by an electronic mail device according to the present invention.

PREFERRED EMBODIMENT OF THE INVENTION

A preferred embodiment of the present invention will be described bellow with reference to accompanying drawings.

Figure 1:
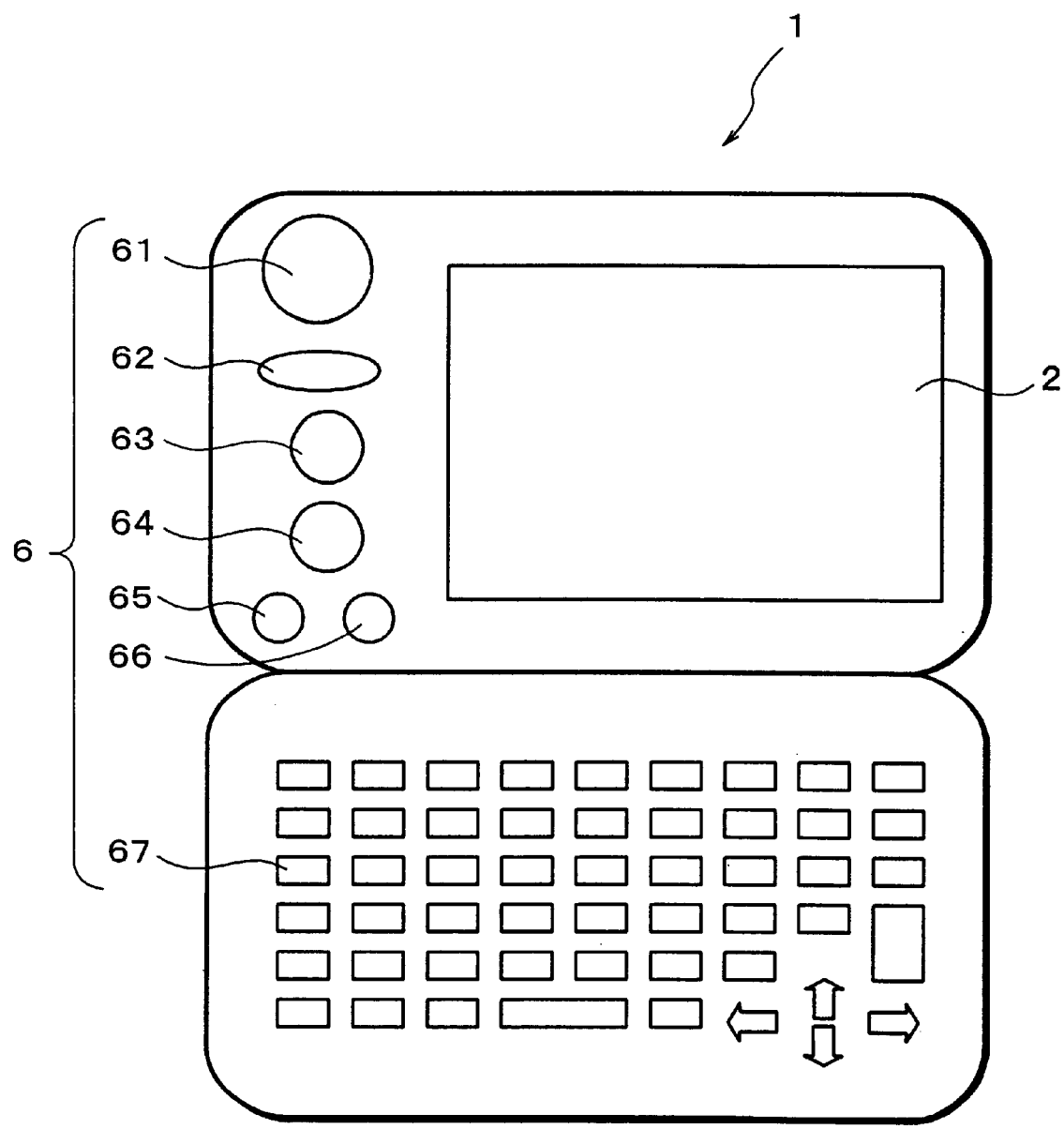
FIG. 1 is a plan view of an electronic device in its open state, which relates to an embodiment of the present invention.

FIG. 1 is a plan view of an electronic device in its open state according to the present invention.

Device body 1 has a liquid crystal display portion 2 for displaying messages and images and an input portion 6 comprising a group of various operation keys 6.

The group of keys 6 includes a power supply key 61 for switching on and off a power source, a mail application key 62, a menu key 63, a voice reproduction start/stop key 64, an OK key 65, a cancel key 66, character input keys (a keyboard) 67 and so on.

The electronic mail application key 62 is used for driving an electronic mail application and the menu key 63 is used for displaying/switching off the menu (a list of available functions) on each image screen.

The OK key 65 and the cancel key 66 are used for executing (or recognizing) and canceling, respectively, during the data input operation or alert information on the display.

Characters can be entered into the device through input keys 67 such as a keyboard or a touch panel. The electronic device incorporates a CPU and memories (ROM and RAM) in its body.

Figure 2:
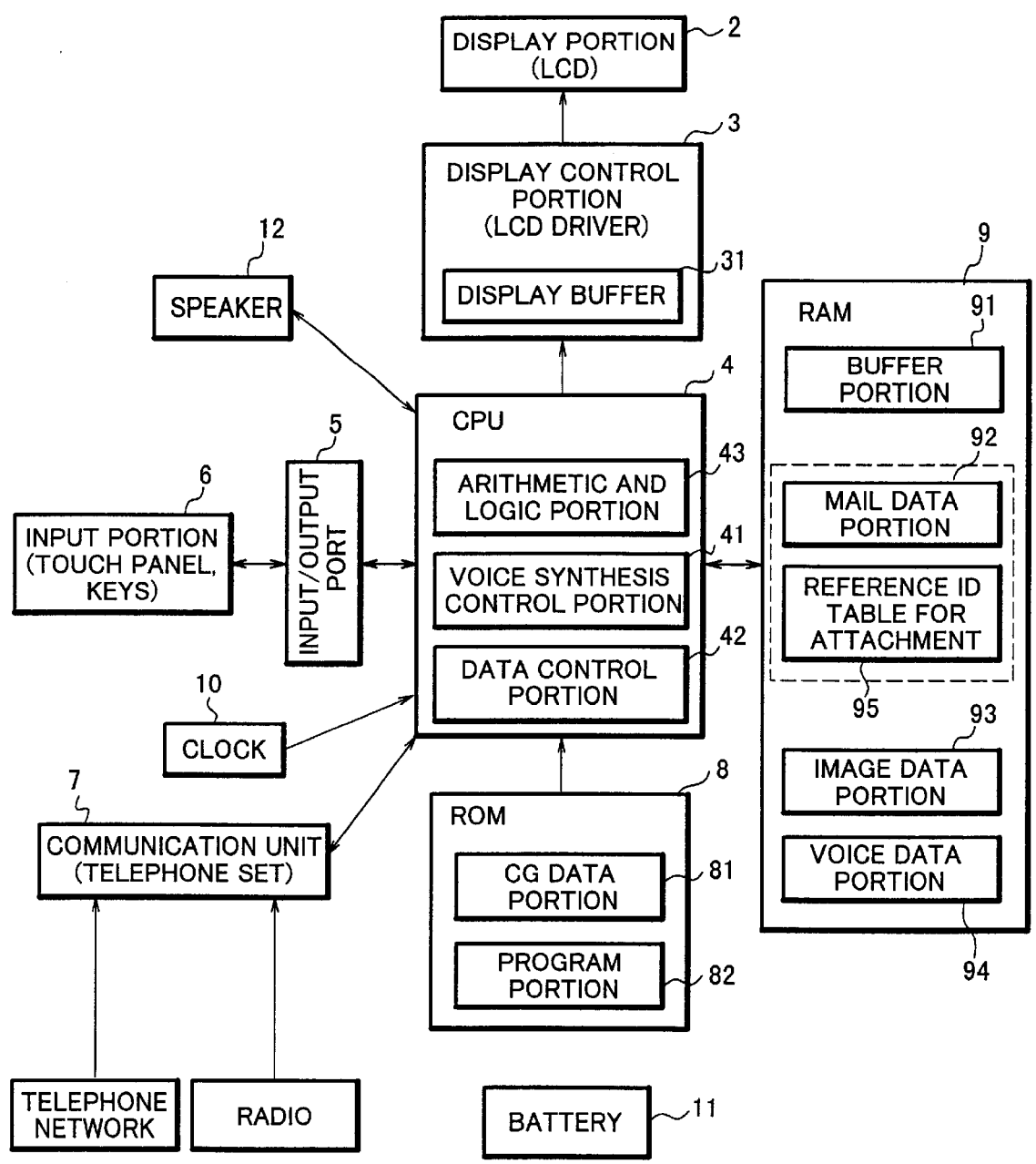
FIG. 2 is a block diagram of a hardware construction of an electronic device according to an embodiment of the present invention.

FIG. 2 is a block diagram of a hardware structure of an electronic mail device according to the present invention.

The components identical to those shown in FIG. 1 are respectively given the same numerals.

In the shown device, the CPU 4 controls the input/output activities of the device and performs all the arithmetic and logical operations. It includes a voice synthesizer control portion 41, a data control portion 42 and an arithmetic and logic portion 43.

The voice synthesis control portion 41 controls the synthesis and reproduction of voice signals. The synthesized/reproduced voice is output through the speaker 12 when the vocal reproduction start/stop key 64 was pressed.

The display portion 2 is, for example, a dot-matrix type liquid crystal display unit (hereinafter referred to as LCD), which displays on its screen a result of arithmetic and logic operation and a message etc. when display data is written in a display buffer 31 within the display control portion 3 (hereinafter referred to as LCD driver) based on a control signal from the CPU 4.

Data input by the input portion 6 is transferred via an input/output port 5 to the CPU 4 that in turn processes the input data and recognizes which function key was pushed.

The read-only memory ROM 8 has a program storage portion 82 for storing programs to realize various functions of the device body 1 and mail display facility according to the present invention and CG data storage portion 81 for storing a character font usable for displaying characters.

The random access memory RAM 9 consists of a buffer portion 91, a mail data portion 92 for storing mail data to be registered in the device body 1, a music data portion 93 for storing a music data file attached to the electronic mail, a image data portion 94 for storing an image data file attached to the electronic mail and a reference ID table 95 for attachment files. The memory stores a variety of data in the corresponding portions.

The data control portion 42 in the CPU 4 controls retrieval of music and image data, related to mail data in the electronic mail data portion 92, respectively, from the music data portion 93 and image data portion 94, referring to the reference ID table 95 for the attachment files in the RAM 9.

The RAM 9 is backed up by a battery 11 not to lose data contained therein in the event of power switched OFF.

A battery 11 is a power source of the device.

A communication unit 7 is used for transmitting and receiving data to and from other parties via a telephone network and/or by radio communication.

Figure 3:
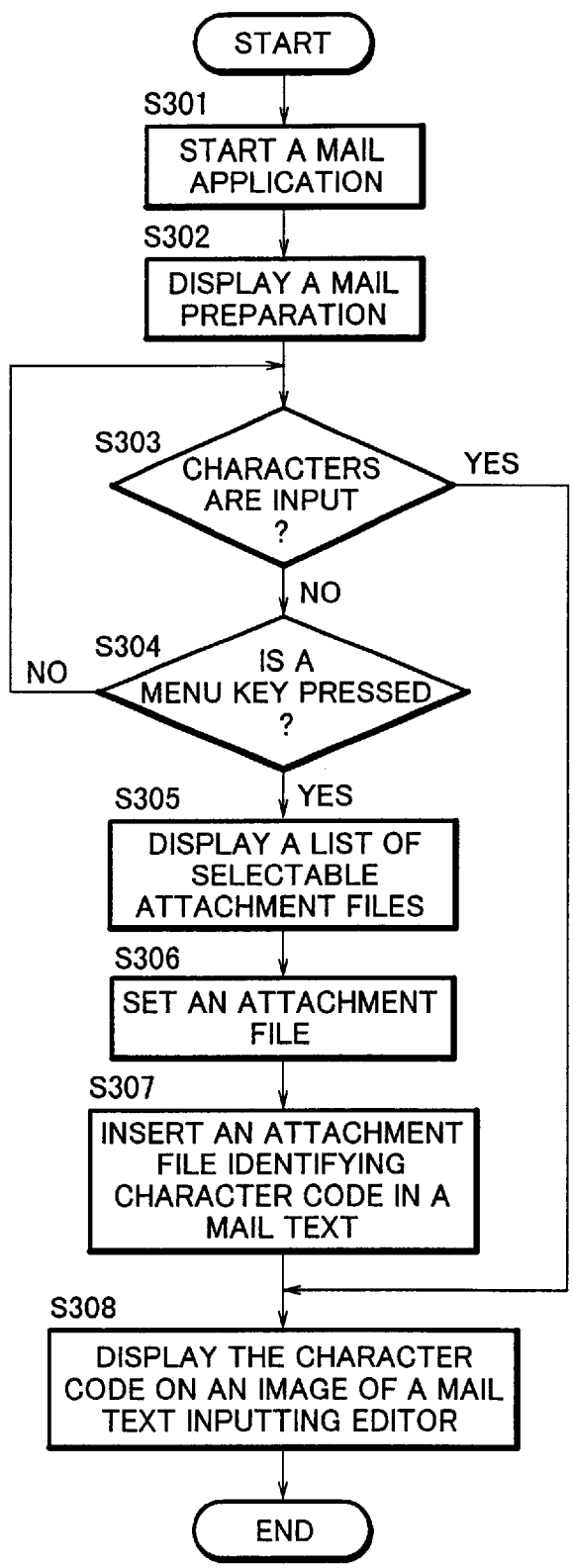
FIG. 3 is a flowchart depicting a procedure for preparing a text of an electronic mail by an electronic device according to an embodiment of the present invention.

FIG. 3 is a flowchart depicting a procedure of processing for preparation of an electronic mail text by an electronic mail device according to the present invention.

Further, FIG. 3 illustrates the procedure of preparing an electronic mail text by selecting a file of music data or image data to be automatically reproduced (displayed) while vocally reproducing by voice the electronic mail text and inserting an attachment file identifying character code (character string) of the selected file in the electronic mail text.

The electronic mail application key 62 (see FIG. 1) of the input portion 6 is first pressed to activate the electronic mail application (Step S301) and presents an image for preparation of the electronic mail text (Step S302).

FIG. 4 shows an exemplary layout of an image for preparation of the electronic mail text.

In the state waiting for input data, the device examines whether a character was input (Step S303) or not. If so, the device displays the input character on an image of a text input editor screen 21 (see FIG. 4) (Step S308).

When a menu key 63 for displaying the menu was pressed rather than any character key in the waiting state of the device (Step S304), the menu (a list of available options) is displayed on the screen (Step S305).

FIG. 5 shows an exemplary layout of an image of a menu presenting a list of options selectable by using a suitable key of the input portion 6.

The user selects (sets) any one of music (or image) files from the menu for selection of attached files of music data (or image data) to be automatically reproduced (displayed) (Step S306), inserts a character code (a character string representing the selected attached file) in a mail text (Step S307), which text is presented on an image of the editor 21 as shown in FIG. 4 (Step S308).

Figure 6:
FIG. 6 illustrates an image of an electronic mail text with an insertion of reference code (character string) of attached file as a text character string in a text image of FIG. 4.

FIG. 6 illustrates an image of the electronic mail with insertion of attachment file identifying character codes (character strings) selected by the user in a text image of FIG. 4.

In FIG. 6, each one of character codes (character strings) is indicated in square brackets.

Attachment file identifying character codes (character strings) are not limited to the shown examples and may also be any other character codes, pictorial symbols, icons and so on.

Figure 7:
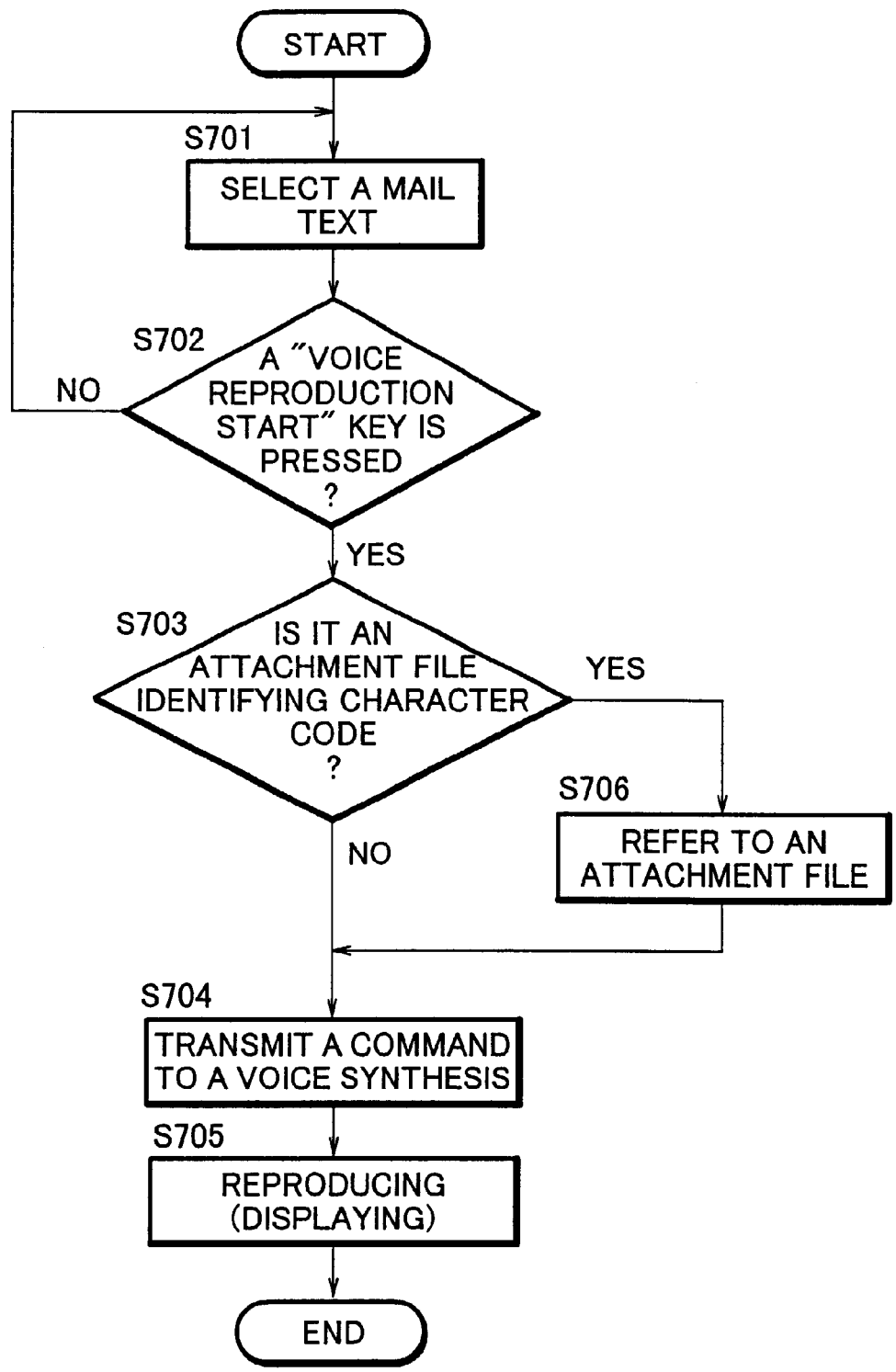
FIG. 7 is a flowchart depicting a procedure for reproducing a content of a received electronic mail prepared and transmitted by an electronic mail device according to the present invention.

FIG. 7 is a flowchart depicting a procedure of vocally reproducing a received electronic mail by an electronic mail device according to the present invention.

Referring to FIG. 7, the procedure of automatically reproducing an electronic mail text with insertion of attachment file identifying character codes (character strings), prepared by the procedure of FIG. 3, is described below.

The electronic mail text to be reproduced by synthesized voice is first selected (Step S701) and the voice reproduction start key 64 (FIG. 1) is pressed (Step S702). Text data to be vocally reproduced by the voice synthesis control unit 41 (FIG. 2) or associated music data is stored in the buffer portion 91 of the RAM 9 (FIG. 2).

A voice synthesis/reproduction command data stored in the buffer portion 91 is transferred to the voice synthesizer control unit 41 to reproduce a speech of the text or music data through a speaker 12.

When an attachment file identifying character code (character string) inserted in the electronic mail text was detected in Step S703, the text sentence before the detected character code is converted to voice synthesis data and reproduction command data that are then transferred to the voice synthesis control unit 41 (Step S704) and reproduced by voice (Step S705).

On completion of voice reproduction of the text portion, the attachment music (or image) file designated by the detected attachment file identifying character code (character string) is reproduced (Step S706) and music data (or image data) is reproduced (displayed) (Step S705).

Again, upon completion of voice reproduction or image displaying for the attachment file, the next reference character codes (character strings) are detected to vocally reproduce the text characters or reproduce (display) for the attachment file.

Figure 8:
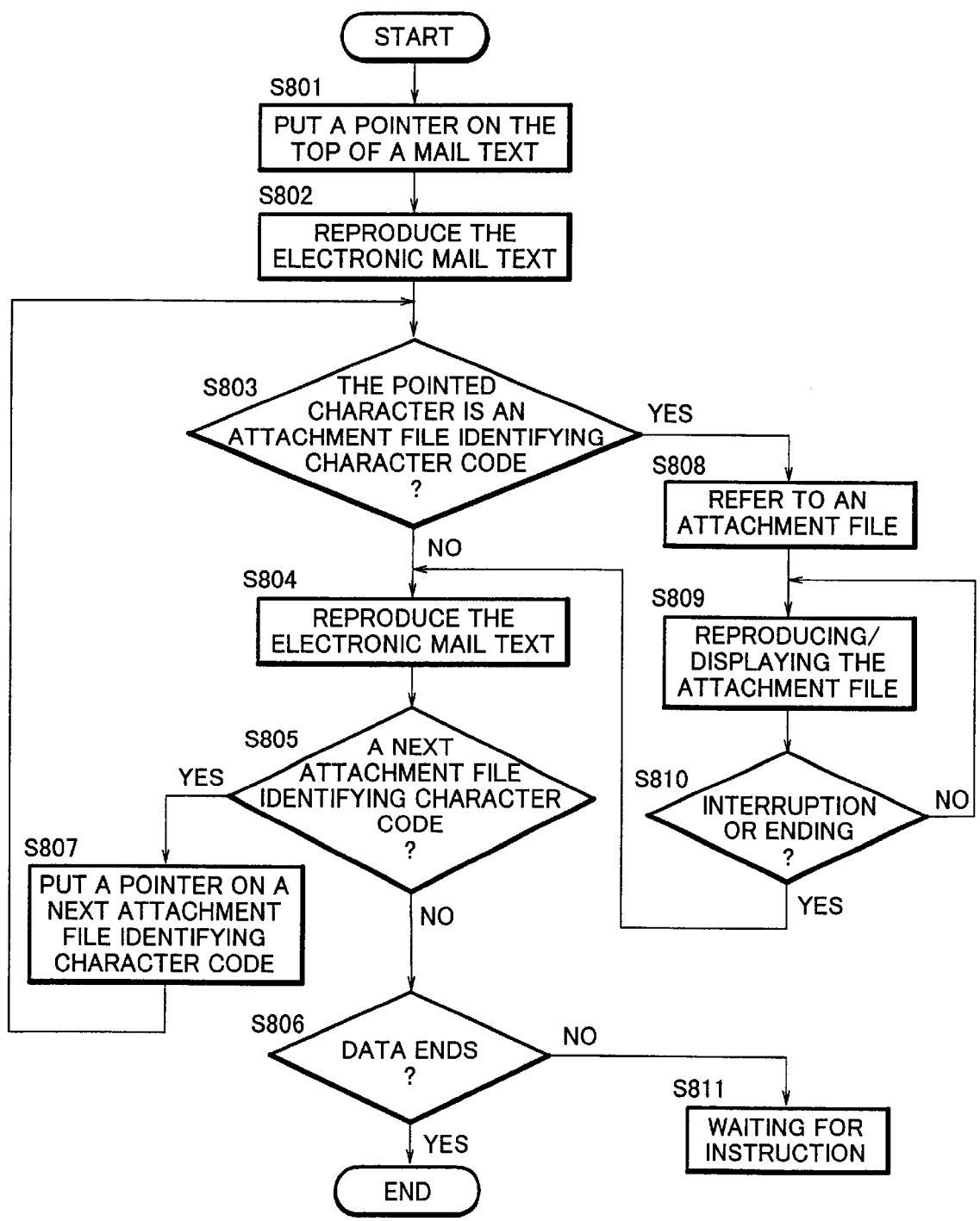
FIG. 8 is a flowchart depicting another procedure for reproducing a content of a received electronic mail prepared and transmitted by an electronic mail device according to the present invention.

FIG. 8 is a flowchart depicting another procedure of vocally reproducing a received electronic mail by an electronic mail device according to the present invention.

To vocally reproduce text data of an electronic mail according to the procedure of FIG. 8, the beginning of the electronic mail text is first designated by the user with a pointer (Step S801). The voice reproduction processing is started with the designated beginning of the text (Step S802) and the beginning part is examined whether or not it is a character code (character string) identifying an attachment file (Step S803).

If an attachment file identifying character code was detected, the attachment file is retrieved (Step S808) and music data (or image data) from the file is reproduced (or displayed) (Step S809). When the reproduction of the music data (or image data) was finished or stopped by interruption with the interrupt key (Step S810), the following text portion of the electronic mail is vocally reproduced (Step S804). If the following part is a character code (character string) identifying another attachment file, the user is requested to point the code position (Step S807).

If the character string was an ending code (not attachment file identifying code), the reproduction of the electronic mail text is finished (Step S806). If not, the device is put in the state waiting for another process (Step S811).

Thus, the process automatically returns to the vocal reproduction of a next phrase of the electronic mail text after reproducing music data or displaying image data and restarts reading aloud the text data until the next attached music or image data file is detected.

The structure of data to be used by the above procedure will be described below.

The electronic mail text prepared or received is stored in the electronic mail data portion 92 of the RAM 9 (FIG. 9). Music data and image data to be attached to the electronic mail text are separately (from the text data) stored together with respective ID numbers in the music data portion 93 and image data portion 94 of the RAM 9.

FIG. 9 illustrates an exemplary structure of music data registered in the music data portion 93 of the RAM 9, while FIG. 10 illustrates an exemplary structure of image data registered in the image data portion 94 of the RAM 9.

When an attached melody (or image) reference code was detected in a received mail text being read aloud, it must be decided which music data in the music data portion 93 of the RAM 9 or image data in the image data portion 94 of the RAM 9 is requested by that code. For this purpose, an ID table is prepared for respective one of mail data and stored/registered in an ID reference table 95 (FIG. 2) in the RAM 9.

The ID reference table 95 contains ID numbers of attached files in the order of precedence of their character codes (character strings) in the electronic mail text.

FIG. 11 illustrates an exemplary data structure of mail text data and an exemplary data structure of a reference ID table for attachment file.

When, the device, in the process of reading aloud a received electronic mail, detected an attachment file reference character code (character string) in the text as shown in FIG. 11 for example in Step S706 (FIG. 7) and Step S808 (FIG. 8), it can get a corresponding ID number from the ID table 95 for data files attached to the electronic mail, retrieves data registered in the music data portion 93 or the image data portion 94 of the RAM 9 and reproduce (display) the data from the identified attachment file.

The above ways enable the device to read aloud the electronic mail text, refer to the attached music file or image file and reproduce the music or image file.

FIG. 12 illustrates practical exemplified text and attached files of an electronic mail prepared by an electronic mail device and a process of reproducing by voice the electronic mail text with the associated attached files according to the present invention.

In the case of vocally reproducing the electronic mail text with attached files, the electronic mail text (first sentence) is read aloud before [melody 1] being an attachment file reference character code (character string) (Step S121). As soon as the reading aloud of the first sentence was completed or interrupted, the attached music file (melody 1) corresponding to the character code [melody 1] is retrieved with reference to an attachment file ID table (FIG. 11) and the content of the file is reproduced (Step S122).

When the music reproduction was finished or interrupted, the process returns to reading aloud the electronic mail text and a next sentence before [image 2] being a next attachment file reference character code (character string) is vocally reproduced (Step S123). When the vocal reproduction of the next sentence was finished or interrupted, an attachment file ID table (FIG. 11) is examined and an attached image file (image 2) corresponding to the character code [image 2] is accessed and reproduced (Step S124).

When the image reproduction was finished or interrupted, the process returns to vocal reproduction of the electronic mail text and a remaining part of the text before [melody 3] being a next attachment file reference character code (character string) is read aloud (Step S125). When the vocal reproduction of the next sentence was finished or interrupted, the attachment file reference ID table (FIG. 11) is examined and an attached music file (melody 3) corresponding to the character code [melody 3] is retrieved and reproduced (Step S126).

Thus, the vocal reproduction of the electronic mail text and accessing to and reproducing of the attached files can be performed.

As apparent from the foregoing, an electronic mail system according to the present invention enables a mail sender to prepare an electronic mail and attached data files, which text is not only displayed but also vocally reproducible and which files can be automatically reproduced at intended timing by inserting respective character codes (character strings) identifying respective files in designated positions in a mail text. Thus prepared electronic mail can express sender's massage with enhanced impression, pleasure and variety of music and images assembled in addition to vocal reproduction of the electronic mail text, which can not be achieved by the electronic mail text only.

Furthermore, the system according to the present invention requires insertion of only attachment file identifying character codes (character strings) in the form of usual textual components without using any unnecessary and strange internal code in the mail text, thereby giving no affection to usual electronic mail content.

An electronic mail system according to the present invention enables a mail receiver (or a mail sender) to view and hear with reality an electronic mail text displayed and vocally reproduced and associated music and/or image data which is reproduced at specified timing by detecting each attachment file identifying character code (character string) inserted in the electronic mail text and retrieving the designated file.

The receiver may feel more real the sender's message with enhanced impression, pleasure and variety that may be produced by automatically reproducing music and image data at timing designated by the sender, which effect cannot be achieved by the electronic mail text only.

The music and image data to be inserted in the electronic mail may be treated with as a usual attachment file that can be open and reproduced separately at any time at the receiver terminal.

An electronic mail system according to the present invention can automatically detect an attachment file identifying character code arranged in a received mail text being displayed and reproduced by voice and can reproduce designated music and image data from each detected attached file at timing specified by the sender and then repeat the above sequence after returning to vocal reproduction of the electronic mail text. This enables the receiver (or sender) to feel more real the sender's message with enhanced impression, pleasure or variety at timing specified by a sender. The above effects cannot be achieved by the electronic mail text only.

What is claimed is:

1. An electronic mail device for an electronic mail text with an attachment file attached thereto, comprising:

a memory for storing the electronic mail text and attachment file;

a display portion for displaying characters and images;

a speaker or said display portion for reproducing the attachment file; and a character, a pictorial symbol or an icon for representing the attachment file, the character, the pictorial symbol or the icon being inserted in the electronic mail text to designate the timing when the attachment file should be reproduced, the inserted character, pictorial symbol or icon not representing a control program;

wherein when the electronic mail device recognizes the character, the pictorial symbol or the icon inserted in the electronic mail text is detected, the electronic mail device discriminates the kind of the attachment file in the memory and reproduces the attachment file according to the result of the discrimination.

2. The electronic mail device as defined in claim 1, wherein the character, the pictorial symbol or the icon is inserted in the electronic mail text during a preparation of the electronic mail text whereby a user selects the attachment file from a menu of available options.

3. The electronic mail device as defined in claim 2, wherein the character, the pictorial symbol or the icon is indicated in brackets.

4. An electronic mail device having function of vocal reproduction for an electronic mail text with a music data file attached thereto, comprising:

- a memory for storing electronic mail text data and attachment file data;
- an input portion;
- a liquid crystal display portion for displaying characters and images;
- a voice synthesis control portion for controlling synthesis of voice; and
- a speaker;
- wherein if the mail device recognizes in vocal reproduction of the electronic mail text that a character, a pictorial symbol or an icon designating the music data file is inserted in the electronic mail text, the electronic mail device reproduces the music data in the music data file in the memory, wherein the inserted character, pictorial symbol or icon does not represent a control program.

5. An electronic mail device as defined in claim 4, wherein if the reproduction of the attached music data file is finished or interrupted, the electronic mail device returns to vocal reproduction of the electronic mail text and repeats vocal reproduction of the text data and reproduction of music data of a next attachment file.

6. An electronic mail device having function of vocal reproduction for an electronic mail text with an image data file attached thereto, comprising:

- a memory for storing electronic mail text data and attachment file data;
- an input portion;
- a liquid crystal display portion for displaying characters and images;
- a voice synthesis control portion for controlling synthesis of voice; and
- a speaker;
- wherein if the mail device recognizes in vocal reproduction of the electronic mail text that a character, a pictorial symbol or an icon designating the music data file is inserted in the electronic mail text, the electronic mail device reproduces the music data in the music data file in the memory, wherein the inserted character, pictorial symbol or icon does not represent a control program.

7. An electronic mail device as defined in claim 6, wherein if the reproduction of the attached image data file is finished or interrupted, the electronic mail device returns to vocal reproduction of the electronic mail text and repeats vocal reproduction of the text data and displaying image data of a next attachment file.

* * * * *